United States Patent [19]

Eremity

[11] Patent Number: 4,636,809

[45] Date of Patent: Jan. 13, 1987

[54] INK CATCHER AND DROP CHARGE SENSING DEVICE

[75] Inventor: Frank Eremity, Hanover Park, Ill.

[73] Assignee: Videojet Systems International, Inc., Elk Grove Village, Ill.

[21] Appl. No.: 789,951

[22] Filed: Oct. 21, 1985

[51] Int. Cl.[4] .............................................. G01D 18/00

[52] U.S. Cl. .................................. 346/75; 346/140 R

[58] Field of Search .............................. 346/75, 140 R

[56] References Cited

U.S. PATENT DOCUMENTS 3,465,351 9/1969 Kevr et al. ............................ 346/75

4,153,902 5/1979 Kanayama ...................... 346/140 R 4,418,352 11/1983 Horike et al. ......................... 346/75

OTHER PUBLICATIONS

A.B. Dick Tech Manual, 1977, "Videojet Coder/-Printer Series 9300", pp. 6-6, 6-7.

*Primary Examiner*—E. A. Goldberg

*Assistant Examiner*—Gerald E. Preston

*Attorney, Agent, or Firm*—McDougall, Hersh & Scott

[57] ABSTRACT

The invention is an ink drop catcher for use in a drop marking device such as an ink jet printer. The catcher receives drops which are not to be deposited on the recording medium. The catcher includes a convoluted passage through which the drops pass to return to the ink supply. An electrode disposed along the convoluted passage senses the current flow created by the accumulation of the charges from a series of test drops. This current flow is used by phasing circuitry to insure that the drops are correctly charged at the time they are formed.

8 Claims, 5 Drawing Figures

INK CATCHER AND DROP CHARGE SENSING DEVICE

BACKGROUND OF THE INVENTION

This invention relates to drop marking devices, such as ink jet printers. Such devices are capable of marking a recording medium, such as paper, labels, and many other surfaces, by creating electrically charged ink drops which are directed onto the recording medium. Drops which are not charged or are inadequately charged do not reach the recording medium but instead pass into an ink catcher which returns the ink to a reservoir for further use. The ink drops are created by forcing the ink under pressure through a nozzle orifice to create a stream which is perturbated, for example, by a piezo-electric device associated therewith. The series of discrete drops thereby formed are then charged by a charging electrode, the degree of charge determining the amount of deflection when the drops thereafter pass through a constant electric field maintained by the deflection electrodes.

At the time that a drop is created its electrical charge must be established by the charging electrode. The charge to be placed on a drop is determined by the magnitude of the signal applied to the charging electrode. This signal is usually referred to in the art as the video signal. If the video signal is in the process of rising or falling or is not present at the time that a drop is formed the charge on the drop will not be proportional to the video signal as intended. This is usually referred to as a phase problem and must be overcome in order to reliably charge selected drops to accurately place drops on the recording medium.

In order to place specific charges on given drops it is necessary to know when drop separation is occurring, that is, the time relationship of drop formation relative to the video signal. If the video signal is not kept in phase with drop separation, the uniformity and fidelity of printing on the medium is adversely affected.

In order to maintain the correct phase relationship, ink jet systems are typically provided with a phase control system, usually of the feedback type, wherein low charge test drops, not intended to strike the recording medium, are generated, sent to the catcher, and their charge sensed. This information is used to alter the phase of the video signal to achieve the correct magnitude and phase of the video signal at the time that each newly formed drop passes through the charging electrode. The phase circuitry system itself forms no part of the present invention. A typical phase control circuit which can be used with the present invention is disclosed in U.S. Pat. No. 3,465,351, which patent is hereby incorporated by reference. Other phase control networks can be suitably employed with the present invention.

Phase control systems require the use of some type of sensing element for detecting the charge present on the test drops. One type of sensing element commonly employed is an ink catcher having a sensing electrode which contacts the test drops received in the catcher. The charge accumulation from the test drops produces a current flow, the magnitude of which, relative to the expected value, can be used to correct and maintain the phase relationship between the video signal and the formation of the drops.

To accurately determine the charge on the drops, it is necessary to provide a sensing electrode which is sensitive and accurate in a rather difficult environment. Specifically, it is necessary to detect very small charges from a collection of ink drops in an ink jet printing head remotely located from the phasing circuitry. Noise and spurious signals have heretofore required the use of shielding and fairly large collection passages to insure producing a reliable phasing signal. Such prior arrangements were bulky and, therefore, interferred with the desire to make the print head as small as possible. In one prior art device, manufactured by applicant's assignee, the ink catcher was provided with an electrically shielded return conduit of substantial length.

The object of the present invention is to provide an ink catcher with drop charge sensing means which is small in size and highly reliable.

It is a futher object to provide such an apparatus which has a high electrical impedance to obtain a significant reduction in signal noise.

A further object of the invention is to provide an ink catcher having an integral drop charge sensing means which avoids the bulk and assembly cost of prior art devices.

Other objects and advantages of the invention will be apparent from the remaining portion of the specification.

DETAILED DESCRIPTION

As indicated in the background section of the specification, it is necessary to maintain proper phase relationship between the time of formation of the ink drops and the video signal so that each drop will have the desired electric charge impressed thereon as it is formed. In order to maintain correct phase, a burst of test drops are generated during the dwell time between printing of messages, having only a small charge imposed thereon. This charge is insufficient to clear the ink catcher and so the drops do not strike the recording medium. On the other hand, the charge is large enough to be detected by the sensing device incorporated in the present invention. Measuring this small test charge and comparing it against the values for correct and incorrect phasing permit control of the phase. As indicated previously, the circuitry for monitoring and adjusting phase forms no part of the present invention and a typical circuit is disclosed in the aforementioned U.S. Pat. No. 3,465,351.

Figure 1:
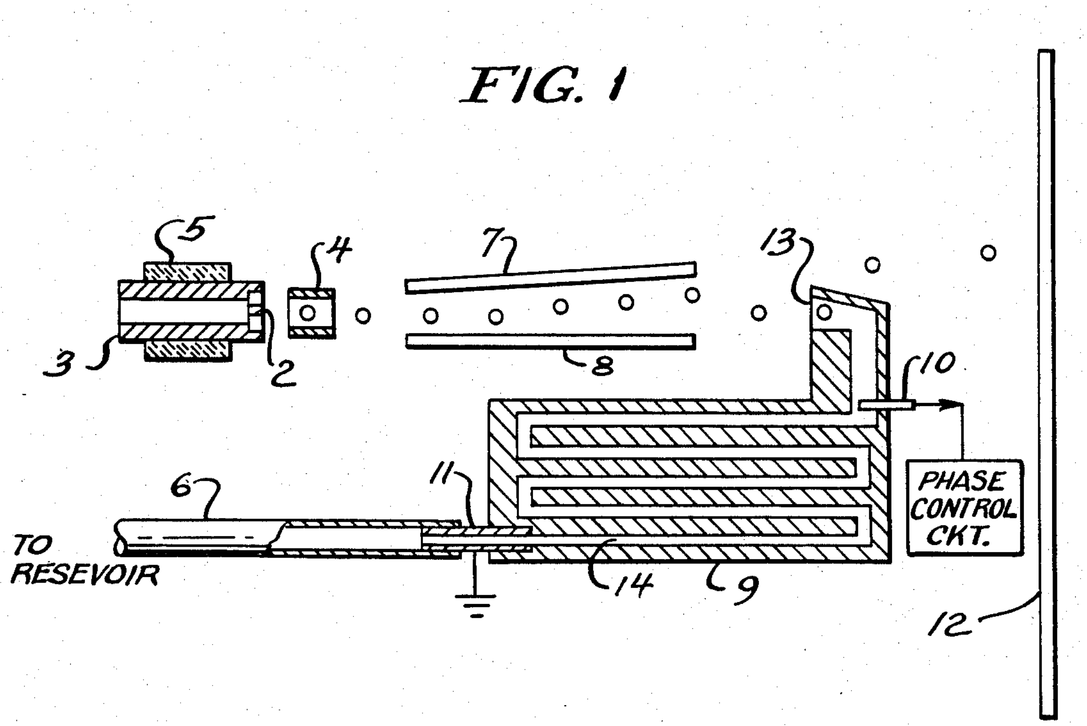
FIG. 1 is a schematic drawing illustrating the elements of a drop marking system and a cross sectional view of a first embodiment of the invention.

Referring to FIG. 1, a system incorporating the ink catcher and drop charge sensing device of the present invention is illustrated. Ink drops emanate from the ink jet nozzle orifice 2, which is located at one end of a typical nozzle housing 3. The ink passing through the nozzle and issuing as a stream is acted upon by the piezo electric device 5 to cause the ink stream to break up into a series of discrete drops.

As the drops are formed they pass, and are charged by, a charging electrode 4. Subsequently, the charged drops pass through a deflection field created by deflection electrodes 7 and 8. The amount the drops are deflected is a function of the charge on each drop thus permitting control of the placement of the drops onto the recording medium 12. Drops not intended to strike the recording medium are collected by an ink catcher 13 which communicates with a vacuum return line 6 via a labyrinth or convoluted passage 14.

During idle time, when the system is on but is not printing messages on the medium, test drops are generated for insuring correct phase between the video signal and drop formation. The test drops are charged in the charging electrode 4 with only a relatively small charge which is insufficient to cause the drops to be deflected over the ink catcher 13. Thus, like an uncharged drop, these test drops are collected by the catcher and pass into the passage 14. These test drops contain a charge which can be detected by a sensing electrode 10 disposed in a first portion of the passage. The sensing electrode is electrically connected to phasing circuitry and is in physical contact with the ink drops as they enter the passage.

The drops form an electrically conductive stream of liquid in the labyrinth passage thereby forming a liquid path between the sensing electrode 10 and a ground electrode 11 disposed at the end of the passage. In one embodiment the ground electrode 11 may be formed as a connecting conduit element for interconnecting the passage with the vacuum line 6. Alternatively, the ground electrode can be formed in the same manner as the sensing electrode and the vacuum line connected directly to the passage. It has been found that down stream from the ground electrode the remainder of the vacuum return line does not need shielding or other electrical isolation.

Because inks used in continuous feed ink jet printers are electrically conductive, the ink in the passageway 14 acts like a resistor between the sensing electrode 10 and the ground electrode 11. This resistance must be high enough (i.e., the path long enough) to prevent shorting the drop charges detected by the sensing electrode 10. The resistance path is necessary to obtain an accurate measurement of the drop charges by the sensing electrode 10. In particular, the ground electrode path insures that the test current detected by the electrode 10 is relatively free of electrical noise and spurious signals caused by agitation of the ink.

Consequently, the passage 14 has to be sized such that the distance between the electrodes 10 and 11 is sufficient to obtain the desired signal quality. Conversely the maximum distance between the electrodes is restricted only by the physical constraints on the print head into which the ink catcher and passage are incorporated. It will be understood by those skilled in the art that ink jet heads are desirably as small as possible and may be remotely located from the control electronics and the ink supply. The requirements of small sensing elements and adequate separation of the sensing and ground electrodes has heretofore required the use of insulated conduit, shielding and assemblies which are costly and difficult to build.

The invention, as illustrated in FIG. 1, is an integral unit which meets the design criteria for an accurate sensing device and which is both compact and simple to manufacture. The two required electrical connections, the sensing electrode and the ground electrode, are provided relatively close together "as the crow flies" but adequately separated because of the use of a convoluted passage through which the ink stream must flow. Thus, the desire to electrically separate the ground electrode from the sensing electrode by a circuit path distance sufficient to insure that a useful signal is obtained at the sensing electrode is accomplished. Preferably the passage is formed in a block or housing of insulating material, such as Delryn plastic or other suitable material. The passage can be molded into the plastic or formed in any other suitable way. Shielding can be provided if necessary.

For purposes of exemplifying the invention, the following dimensions and voltages are given. These values are not critical to the invention but are illustrative of a working embodiment. During dwell periods, when the print head is not producing drops for marking on the medium 12, a series of test drops are charged by applying a relatively low voltage to the charging electrode 4, usually in the range of 10 to 40 volts (typically 90 plus volts are used for charging drops to be deflected onto the recording medium). These low voltage drops are collected by the catcher 13 and enter the labyrinth passage 14 formed in the block of insulating material 9. As the drops form a stream in the passage, the charges thereon are detected as a current by the sensing electrode 10. For example, a series of 160 drops having a charge of 40 volts each will create a current of approximately 10 nanoAmps if there is proper synchronization between drop formation and the video signal. This current is provided to a phase control network of any suitable type as, for example, disclosed in the aforementioned U.S. Pat. No. 3,465,351. If the correct current is detected, phase remains unchanged. If a lower than expected current is detected, this indicates incorrect phasing between drop formation and the video signal. The phase control network then alters the phase relationship until proper phase is re-established.

In order to reduce electrical noise so that the signal detected by the electrode 10 is accurate at such low current values, the ink flow in the passage is grounded via the electrode 11. Because the ink has a finite resistivity, typically 700 ohm-cm, if the electrical separation between the electrodes is sufficient, the sensing electrode will obtain a proper, low noise signal. For inks typically used in drop marking systems a minimum effective length of the passage is about $1\frac{1}{2}$ to 2 inches. Typically a four inch path is employed with satisfactory results.

Figure 3:
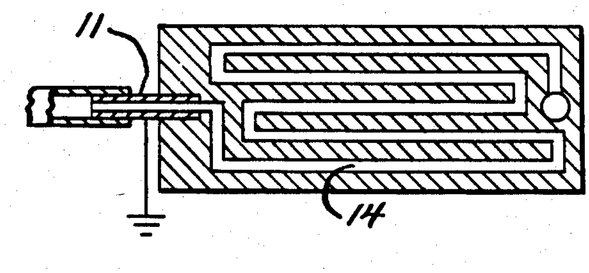
FIG. 3 is a bottom plan view of the second embodiment illustrating the labyrinth passage.
Figure 2:
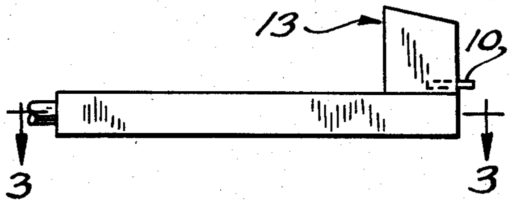
FIG. 2 is a side elevational view of a second embodiment of the invention.

The present invention provides a four inch effective path length in a space of only approximately one and one-half inches due to the use of the convoluted passage arrangement which, of course, can take various forms. FIGS. 2 and 3 illustrate an alternate embodiment of the invention in which the passage is provided in a plane perpendicular to the plane of the passage shown in the FIG. 1 embodiment. In all functional respects the operation of the invention is the same as the FIG. 1 embodiment.

Figure 4:
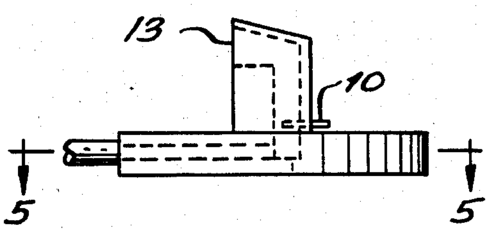
FIG. 4 is a side elevational view of a third embodiment of the invention.
Figure 5:
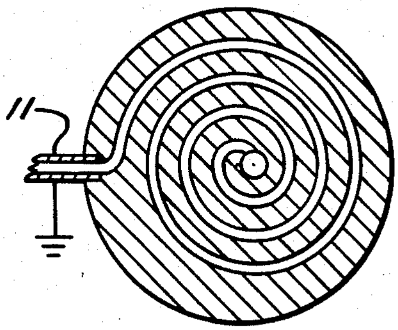
FIG. 5 is a bottom plan view of the third embodiment.

The FIG. 4 embodiment shows a further arrangement of the passage. In this embodiment the drops pass from the catcher downwardly to a passage which progresses radially outwardly to a point of connection with the vacuum line via the ground electrode. It will be apparent to those skilled in the art that other arrangements are possible and contemplated by the present invention. For example, multi-layered passages can be used where significantly longer passage lengths are desired.

The result of the construction disclosed herein is an integral and compact ink catcher and drop charge sensing device as compared with existing apparatus.

While I have shown and described embodiments of the invention, it will be understood that this description and illustrations are offered merely by way of example, and that the invention is to be limited in scope only as to the appended claims.

I claim:

1. A device to collect electrically conductive ink drops and to permit sensing of the electrical charge thereon comprising:

(a) a housing formed of electrically insulating material having a convoluted passage formed therein, an entry end of said passage being disposed to receive ink drops directed thereat to permit entry into said passage, an exit end of said passage permitting egress there-from, said passage defing an ink flow path of substantially greater length than the distance between the entry and exit ends;

(b) a sensing electrode disposed near the entry end of said passage, for physically contacting the ink drops entering said passage to permit sensing of the electrical charges thereon;

(c) an electrode connected to ground disposed near the exit end of said passage and physically contacting the stream of ink formed by the drops collected in said passage to create a circuit path through the electrically conductive ink between the sensing electrode and ground to reduce electrical noise;

whereby circuit means may be connected to said sensing electrode to sense the electrical charges of the ink drops.

2. The device of claim 1 further including circuit means connected to said sensing electrode for sensing the electrical charges of the ink drops contacting said sensing electrode.

3. The device of claim 1 wherein said housing is formed of nonconducting plastic material and said passage is molded therein.

4. The device of claim 1 wherein the length of the convoluted passage formed in the housing is at least twice the length dimension of the housing.

5. The device of claim 1 wherein the ground electrode is in the form of an electrically conductive conduit member permitting ink flow from said exit end of the passage.

6. In a drop marking system employing electrically conductive ink drops to mark a recording medium and having an ink return system to collect and reuse drops which are not directed onto said medium, said return system including an ink catcher and means for sensing the charges on drops received by the catcher, the improvement comprising:

(a) said catcher being formed from electrically insulating material having a convoluted passage formed therein, an entry end of said passage being disposed to receive ink drops directed thereat to permit entry into said passage, an exit end of said passage permitting egress therefrom, said passage defining an ink flow path of substantially greater length than the distance between the entry and exit ends;

(b) the means for sensing the drop charges including at least one electrode associated with the passage.

7. The device of claim 6 wherein said catcher is formed of a nonconducting plastic material and said passage is molded therein.

8. The device of claim 6 wherein the length of the passage formed in the catcher is at least twice the length dimension of the catcher.

* * * * *